United States Patent [19]

Madelin

[11] 4,372,780

[45] Feb. 8, 1983

[54] PROCESS FOR RECOVERY OF METALS CONTAINED IN PLOMBIFEROUS AND/OR ZINCIFEROUS OXIDE COMPOUNDS

[76] Inventor: Bertrand Madelin, 1, avenue Albert Einstein, 78190 Trappes, France

[21] Appl. No.: 195,304

[22] Filed: Oct. 8, 1980

Related U.S. Application Data

[63] Continuation of Ser. No. 57,171, Jul. 13, 1979, abandoned.

[30] Foreign Application Priority Data

Jul. 13, 1978 [FR] France .............................. 78 20933

[51] Int. Cl.³ .......................... C22B 4/04; C22B 7/02; C22B 13/02; C22B 19/04
[52] U.S. Cl. .......................................... 75/14; 75/25; 75/77; 75/88
[58] Field of Search .................... 75/14, 88, 77, 25; 266/156

[56] References Cited

U.S. PATENT DOCUMENTS

| 3,262,771 | 7/1966 | Ban | 75/88 |
| 3,770,416 | 11/1973 | Goksel | 75/25 |
| 4,164,418 | 8/1979 | Tokunaga et al. | 75/88 |

FOREIGN PATENT DOCUMENTS

| 210186 | 1/1956 | Australia | 75/88 |
| 2317363 | 2/1977 | France | 75/88 |
| 2352064 | 12/1977 | France | 75/88 |
| 922056 | 3/1963 | United Kingdom | 75/25 |

Primary Examiner—M. J. Andrews
Attorney, Agent, or Firm—Fleit & Jacobson

[57] ABSTRACT

Process for recovery of zinc and lead contained in oxidized zinc and lead compounds characterized by the facts that, after drying, the compound is injected into a pig iron bath and the gasses released are condensed, allowing lead and zinc to be recovered in metallic form.

23 Claims, 1 Drawing Figure

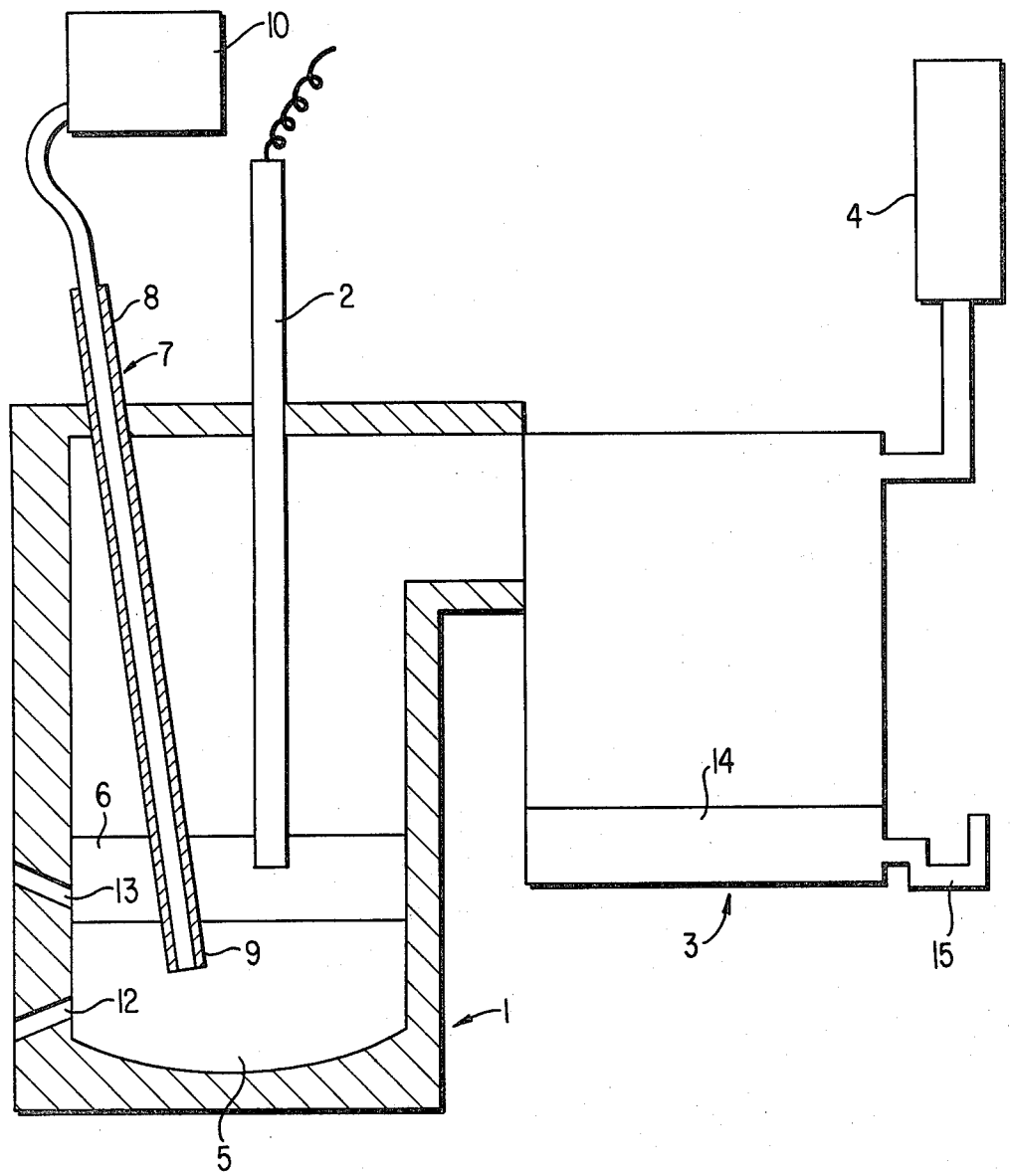

PROCESS FOR RECOVERY OF METALS CONTAINED IN PLOMBIFEROUS AND/OR ZINCIFEROUS OXIDE COMPOUNDS

This is a continuation of application Ser. No. 57,171 filed July 13, 1979, now abandoned.

The present invention concerns a process for recovery of metals contained in oxidized lead and zinc compounds and, more particularly, those contained in the dust of blast-furnaces and steel plants. Said process enables the recovery of iron, lead and zinc, among others.

The filtration of gasses issuing from blast-furnaces and steel plants enables the recovery of dust having quite variable contents of iron and non-ferrous metals such as zinc and lead. Generally, said dust cannot be reused in a cast-iron manufacturing cycle because of its overly high zinc, lead and alkaline metal content. In the same way, in most cases, it cannot be economically recycled into the processing of zinc or lead because its content of these metals is too low.

Various pyrometallurgical processes presently exist for treating said dust issuing from blast-furnaces and steel plants. According to the Waelz process, steel plants dust, previously agglomerated with a combustible carbon compound, is placed in a rotating horizontal furnace, producing, on the one hand, an iron oxide-enriched residue which may be introduced into a blast-furnace and, on the other hand, lead and zinc oxides.

French Pat. No. 2,352,064 describes a process enabling the recovery of lead and zinc in oxidized form, utilizing an electrothermic furnace in which dust rich in zinc is introduced after having been agglomerated with petroleum wastes. This process does not enable a satisfactory recovery of iron.

According to other process, dust having low lead and zinc content is collected and introduced into an electric furnace enabling recovery of iron joined with cobalt, nickel and chrome, on the one hand, and, on the other, zinc and lead oxides, which are extracted from the smoke.

It should be noted that according to these various processes, it is necessary to agglomerate the blast-furnace or steel plant dust with carbon before placing it into a furnace. In addition, said processes do not all enable recovery of iron and they conduce to the capture of lead and zinc oxides. If it is desired to obtain these metals in metallic form, some later treatment, generally an electrolysis, is required. Therefore, one purpose of the present invention is to provide a process for direct recovery in metallic form of zinc and lead contained in dust issuing from blast-furnaces and steel plants.

Another purpose of the invention is to provide a process for recovering the iron contained in such dust directly in the form of pig iron.

A supplementary purpose is to provide a process of this type which generally will not require prior agglomeration of said dust and which will not include a calcination step.

A supplementary purpose is to provide a process of this type which will not require use of a highly refined carbon material such as coke.

An object of the present invention is an installation for the practice of such a process.

Said purposes and object, as well as others which will appear in the following, are attained by the recovery process under the present invention, in accordance with which oxidized lead and/or zinc compounds issuing, for example, from a blast-furnace or steel plant, are first dried and then injected into a pig iron bath in a non-oxidizing atmosphere, following which the vapors released are condensed and lead and zinc are recovered in metallic form.

The granule size of said lead and/or zinc compounds is such that the dimensions of the constituent particles are advantageously between 0 and 4 mm, and preferably between 0 and 1 mm. When said oxidized compounds issue from a steel plant, it is generally not necessary to pulverize them. In other cases, where required, the granule size of the oxidized compunds is modified so that the $d_{80}$, i.e., the dimension of the smallest mesh which will allow 80% by weight of the product to pass through, will be less than 4 mm, and preferably less than 1 mm. In the following description, the oxidized lead and/or zinc compounds, following possible pulverization, shall be designated as powders.

Advantageously, the temperature of the pig iron bath is between 1100° and 1600° C., and preferably between 1250° and 1500° C.

According to a preferred embodiment, the process is carried out within a sealed electric furnace.

Advantageously, the pig iron bath is carbon-saturated. Prior to injection, the powders may be mixed with carbon, without it being necessary to prepare an agglomeration.

Preferably, the vapors released above the pig iron bath are condensed at a temperature lower than 900° C. This temperature may even be lower than 400° C.

The gasses from the condensation stage are passed through a particle-removing cyclone and then introduced into a washer.

To dry the powders before mixing them with carbon, the energy arising from the combustion of the gasses issuing from the washer may be advantageously utilized.

It may be desirable to wash the powders before drying them.

Preferably, the powders are injected into the furnace by means of a gas vehicle which is non-oxidizing with respect to zinc vapor, such as nitrogen, argon or the gasses issuing from the installation placed after the condensation stage.

The installation or apparatus for reduction to practice of this process comprises a sealed electric furnace equipped with means for injecting said powders and a condenser, which communicate at their upper part.

Advantageously, the electric furnace is one having submerged electrodes.

Means for injecting the powders are chosen from among the group comprising injection rods, injection nozzles and hollow electrodes.

The furnace may also include a lock chamber for introducing a portion of said powders.

Said installation may likewise comprise a mixer in which the powders are mixed with carbon before being injected into the electric furnace.

Above said mixer, said installation may include an apparatus for drying said powders, which may be situated after a washer. A decanting filter is disposed between the washer and the drying apparatus.

Advantageously, said installation comprises a gas filtration assembly disposed after the condenser.

Said installation may likewise comprise safety valves which are released when the gas pressure within the installation exceeds a given value.

The description which follows, which is not intended to be limiting, must be read with reference to the attached FIGURE representing in schematic cut an installation enabling reduction to practice of the process under the invention.

As can be seen from said FIGURE, such an installation comprises a sealed electric furnace 1, equipped with an electrode 2 and condenser 3 which is connected to electric furnace 1, on the one hand, and, on the other, to gas filtration apparatus 4.

Electric furnace 1, which according to this embodiment is an electric furnace with submerged electrode, contains a bath of liquid pig iron 5 topped with slag 6. In this example, an injection rod 7 is utilized, the upper part 8 of which is linked to a powder injection apparatus 10.

According to the process of the present invention, powders previously mixed with carbon are injected by means of said injection rod 7 into liquid pig iron bath 5. Said powders are injected under the surface of liquid pig iron 5, even if the orifice of injection tube 7 is located at the slag-iron interface. The quantity of carbon to be introduced corresponds essentially to the sum, on the one hand, of the stoechiometric quantities necessary for reduction of zinc oxide and the oxides of metals which are less reductive than zinc at the temperature of the pig iron bath, such as lead, copper, nickel, sodium and potassium, and, on the other hand, to the quantity necessary to reduce the desired fraction of iron and manganese.

Generally, in the interest of economizing on carbon material, carbon is introduced in a quantity sufficient to transform 40 to 80% of the iron oxides into pig iron.

However, this process still yields acceptable results when the furnace is operated so as to reduce iron in greater proportions and to reduce chrome and manganese. However, this requires a greater quantity of carbon and therefore increases the cost of the process.

Operation of the furnace and introduction of carbon are such that the silicium content of the metallic bath remains lower than 5% by weight, and preferably lower than 2%.

The carbon may be introduced in any possible form, on the condition that it be soluble in iron or its alloys to form pig iron. For this reason, the content of volatile matter must not be too high, i.e., must remain lower than 35% by weight, since carbon in such form is generally not soluble in iron or in ferro-alloys for production of pig iron. Among others which may be used are coal-coke mixtures with more than 50% coal, coals of various compositions and products of low commercial value by reason of their granular size, such as coal dust.

The specialist in the art will note the economic attractiveness of a process which does not require a product as highly refined as coke.

For said injection, a gas vehicle is utilized which must be non-oxidizing, so as to avoid later reoxidation of the gaseous zinc. To this end, a neutral gas such as nitrogen or argon might be chosen, or a reductive gas such as carbon monoxide.

The injection of the powders may likewise be performed by means of a hollow electrode. In this case the powders are injected into slag 6 at the surface of liquid pig iron bath 5. At least one lower or lateral nozzle opening into liquid pig iron bath 5 might also be utilized. If introduction of a portion of the powders in compact form (small balls or briquettes, for example) is foreseen, electric furnace 1 must include a lock-chamber. This form of introduction may be used particularly to introduce a portion of the powders along the walls of electric furnace 1 so as to obtain a protective automatic packing. These various modes are complementary.

Before mixing said powders with carbon, it is obvious that they must be dried. It may possibly be desirable to wash them before drying them. Between the washer and the drying apparatus is disposed a decanting filter.

The injected powders spread out in liquid pig iron bath 5. The carbon dissolves in the liquid pig iron and, mixed with the powders, reduced the various oxides, particularly those of lead and zinc and, when present, those of elements less reductive than zinc, such as iron, copper, nickel, sodium, manganese and potassium.

In order to obtain good reaction kinetics and total reduction of the lead and zinc, the temperature of liquid pig iron 5 must be between 1100° and 1600° C., the preferred interval being between 1250° and 1500° C.

With regard to temperature, certain metals are volatile, particularly zinc, lead, potassium, sodium and manganese. Vapors are therefore released above liquid pig iron bath 5 which contain, in addition to said metals, carbon monoxide and sodium and potassium chlorides and sulphates present in the injected powders. Said vapors likewise comprise the gas vehicle, if one was used in the injection of the powders into the furnace.

Nonvolatile elements such as iron, copper and nickel dissolve in liquid pig iron 5, after having been reduced by carbon. This brings on an increase in the volume of liquid pig iron bath 5.

Elements which are neither reduced by carbon nor volatilized in this temperature range, such as chrome and silicium, collect in slag 6 which tops liquid pig iron bath 5.

When these two elements are present in the liquid pig iron bath, they serve to reduce the powders and collect in oxidized form in the slag.

Periodically, slag 6 is tapped through tap hole 13, as is the supplementary portion of the pig iron produced between two tappings, through tap hole 12.

The vapors released in electric furnace 1 next enter condenser 3 at a temperature generally comprised between 1300° C. and 1000° C. Their temperature decreases to about 450° to 600° C. in order to obtain a satisfactory condensation and a sufficient surfusion of the liquid mixture 14 thus obtained, so that there will be no molding problem.

According to another embodiment, said vapors are condensed at a temperature lower than 400° C., thus producing metallic powders. As in these two cases, it will be noted that condensation of the vapors issuing from the electric furnace is not necessarily carried out by tempering.

Thus a mixture 14 is recovered which may be either liquid or solid according to the condensation temperature and which contains inter alia the zinc and lead initially present in the injected powders. If said mixture 14 is liquid, it is withdrawn from condenser 3, e.g., through a trap 15. Later, the lead and zinc may be separated from liquid mixture 14 by liquation and filtered in the classic manner in a distillation column. Where mixture 14 is solid, i.e., constituted by solid metallic particles, it is withdrawn from condenser 3 by any convenient means, and is then treated according to known methods in order to recover zinc and lead, among others.

Such an installation must be sealed in its entirety so as to prevent any entry of air, failing which a reoxidation of the gaseous zinc or of carbon monoxide could take place. Furthermore, such exothermic reoxidation would produce a temperature increase. These two major drawbacks can be avoided if, on the one hand, said installation is maintained at slightly higher than normal pressure, and if, on the other hand, the level of slag 6 remains at all times above the level of tap hole 13 of slag 6 so as to avoid any contact between the outside air and the vapors released.

Because of the higher pressure maintained within said installation, it is necessary to provide safety valves which release when the gas pressure within said installation raises above a given value.

From condenser 3 escape gasses which are introduced into filtration apparatus 4 constituted, for example, by a particle-removing cyclone followed by a washer. A portion of the gas leaving the washer may be reutilized as a gas vehicle for the powder. The rest of said gas is burned. The energy produced in this combustion may be used to dry the particles before mixing them with carbon.

The examples described below will enable specialists in the art to better understand the reduction to practice and the advantages procured by the process and apparatus of the present invention.

EXAMPLE 1

Into an installation such as that represented in the attached figure is injected a mixture of anthracite and steel plant dust by means of an injection rod 7. The carbon content of said mixture is 12%. The composition by weight of said dust is the following:

| Fe | 24.3% | as | $Fe_3O_4$ | 33.6% |
|---|---|---|---|---|
| Zn | 29.1 | | ZnO | 36.2 |
| Pb | 3.66 | | PbO | 3.94 |
| Mn | 4.72 | | MnO | 6.09 |
| Ca | 3.58 | | CaO | 5.01 |
| $SiO_2$ | 3.32 | | $SiO_2$ | 3.32 |
| Na | 1.04 | | $Na_2O$ | 1.40 |
| K | 1.04 | | $K_2O$ | 1.25 |
| Mg | 1.55 | | MgO | 2.06 |
| Al | 0.32% | as | $Al_2O_3$ | 0.60% |
| Ti | 0.22 | | $TiO_2$ | 0.37 |
| Cr | 0.56 | | $Cr_2O_3$ | 0.82 |
| Cu | 0.12 | | CuO | 0.15 |
| Ni | 0.03 | | NiO | 0.04 |
| V | <100 ppm | | | |
| Ag | 40 ppm | | | |
| Bi | 95 ppm | | | |
| S | 0.98 | | $SO_3$ | 2.45 |
| C | 0.76 | | C | 0.76 |
| P | 420 ppm | | $P_2O_5$ | 0.10 |
| Cl | 1.31 | | Cl | 1.31 |
| $H_2O$ | 0.18 | | $H_2O$ | 0.18 |
| | | | Total | 99.65% |

The difference between this total and 100 arises, on the one hand, from errors of measure, and, on the other, from the fact that all of the constituents were not determined.

Liquid pig iron bath 5 is maintained at a temperature on the order of 1400° C.

Injection of one kilogram of a mixture of steel plant dust and anthracite yields pig iron, liquid mixture 14 containing lead and zinc, and slag 6. The respective compositions of these products are indicated in the following table.

| Elements | Pig Iron | Liquid Mixture | Slag |
|---|---|---|---|
| Zn | — | 81% | 0.1% |
| Pb | — | 10.3% | 0.05% |
| Na | — | 2.9% | — |
| K | — | 2.8% | — |
| Cl | — | 1.0% | — |
| S | 0.5% | 1.5% | 0.5% |
| Fe | 95.0% | 0.2% | FeO: 30% |
| Mn | 0.1% | 0.1% | MnO: 20% |
| C | 4.0% | — | — |

These results show that lead and zinc are recovered in a very satisfactory manner.

From such steel plant dust are recovered (per ton of mixture injected): 170 kg of carbon-saturated pig iron; 180 kg of slag; 310 kg of liquid mixture containing lead and zinc.

The electrical energy necessary to perform this process was 1.7 kWh/kg of injected mixture.

It is noted that the presence of sodium and potassium in liquid mixture 14 enables elimination of certain impurities such as iron and arsenic, by formation of intermetallic compounds such as zinc-iron-sodium or zinc-arsenic-sodium at the time of cooling.

EXAMPLE 2

Before drying steel plant dust having the same compostion as in the preceding example, it may be desirable to wash said dust in order to eliminate the halogens, sulphates and a portion of the alkaline metals which they contain. Concerning the latter, it is possible to eliminate up to 75% by such washing.

The liquid mixture 14 which is then collected has the following composition: Zn 86.2%; Pb 11%; Na 0.7%; K 0.7%.

EXAMPLE 3

The blends used in the various zinc manufacturing processes are generally in the form of flotation concentrates with rather fine granules. In general, their analysis is the following: Zn 45–50%; S 30%; Fe 10%; Pb 2%.

The first stage of zinc metallurgy is a roasting which enables an oxidized product to be obtained. From among the various roasting processes may be used a fluidized-bed roasting which enables a finely granulated oxidized product having the following analysis to be obtained: Zn 50–55%; S 0.2%; Fe 14%; Pb 2%.

This oxidized product is well adapted to our process (granule size and composition). It may be injected into the liquid pig iron while still hot, thereby enabling reduction of the electrical energy necessary for the treatment.

Per ton (1000 kg) of roasted concentrate, such a product will yield: 100 kg of pig iron; 100 kg of slag; 500 kg of a lead/zinc alloy with 4–5% lead.

Although these examples are primarily concerned with the recovery of lead, zinc and iron contained in steel mill dust, the process under the invention may also be utilized for recovering these same metals from, e.g., blast-furnace or galvanization dust or from oxidized ores.

For example, this installation may be coupled with a fluidized-bed roasting furnace, thereby enabling treatment of sulphur concentrates as in example 3.

Although any oxidized product may be treated according to the present invention, it is preferable that such product contain a sufficient quantity if iron for the composition of the metallic bath to be as close as possible to that of pig iron. For example, when the powders contain metals such as nickel, cobalt, or chrome, it is desirable that the iron content be high enough so that the quantity of these elements in the final pig iron will be less than 5% and preferably less than 2% by weight.

Generally, the process is particularly suited to products containing more than 5% iron and less than 60% zinc.

In fact, for products with a zinc content higher than 60%, other processes would probably be more economical, in view of the high commercial value of such compounds.

I claim:

1. Process for the recovery of lead and zinc contained in oxidized lead and zinc products, comprising injecting said products, after drying, into a bath of molten pig iron having a temperature below about 1500° C. and condensing the released gasses thus allowing the lead and zinc to be recovered in metallic form.

2. Process according to claim 1, wherein said products injected into said bath are pulverized to a mesh size of between 0 and 4 mm.

3. Process according to claim 1, wherein said products are steel plant dust, blast-furnace dust, or mixtures thereof.

4. Process according to claim 1, wherein said temperature is between about 1250° and 1500° C.

5. Process according to claim 1, wherein said pig iron bath is contained in a sealed submerged-electrode furnace.

6. Process according to claim 1, wherein said pig iron bath is carbon-saturated.

7. Process according to claim 1, wherein said products are mixed with carbon prior to being injected into said bath.

8. Process according to claim 1, wherein said gasses released from the pig iron bath are condensed at a temperature lower than 900° C.

9. Process according to claim 8, wherein said condensation temperature is lower than 400° C.

10. Process according to claim 1, wherein the gasses issuing from the condensation stage are filtered.

11. Process according to claim 10, wherein any particulate matter in said gasses is removed before said gasses are washed and burned away.

12. Process according to claim 1, wherein the energy needed to dry said products before injection into said bath is at least partially provided by the combustion of at least a part of the noncondensed gasses.

13. Process according to claim 1, wherein said products are injected into said bath using a gas vehicle which is non-oxidizing with respect to zinc vapor.

14. Process according to claim 13, wherein said gas vehicle is nitrogen or argon.

15. Process according to claim 14, wherein said gas vehicle is filtered gasses.

16. Process according to claim 1, wherein 40 to 80% of the iron in said bath of molten pig iron is reduced.

17. Process according to claim 1, wherein said bath of molten pig iron contains less than 5% by weight silicium.

18. Process for the recovery of lead and zinc contained in oxidized lead and zinc products, comprising mixing the products with carbon and injecting said products, after drying, into a bath of molten pig iron having a temperature below about 1500° C. and condensing the released gasses thus allowing the lead and zinc to be recovered in metallic form.

19. Process according to claim 18, wherein the quantity of carbon mixed with the products is at least essentially the stoichiometric quantity necessary to reduce the oxidized lead and zinc products.

20. Process for the recovery of lead and zinc contained in oxidized lead and zinc products, comprising injecting said products, after drying, into a bath of molten, substantially carbon-saturated pig iron having a temperature below about 1500° C. and condensing the released gasses thus allowing the lead and zinc to be recovered in metallic form.

21. Process according to claim 20, wherein the temperature of said bath is below about 1250° C.

22. Process for the recovery of lead and zinc contained in oxidized lead and zinc products, comprising injecting said products, after drying, into a bath of molten pig iron having a temperature below about 1500° C., said bath of molten pig iron containing less than 5% by weight silicium and from 40 to 80% of the iron in the reduced state, and condensing the released gasses thus allowing the lead and zinc to be recovered in metallic form.

23. Process for the recovery of lead and zinc contained in oxidized lead and zinc products, comprising injecting said products in powdered form, after drying, into a bath of molten pig iron having a temperature below about 1500° C. and condensing the released gasses in an atmosphere containing substantially no carbon dioxide thus allowing the lead and zinc to be recovered in metallic form.

* * * * *